F. P. JOHNSON.
WHEEL RIM.
APPLICATION FILED FEB. 23, 1915.
1,166,990. Patented Jan. 4, 1916.
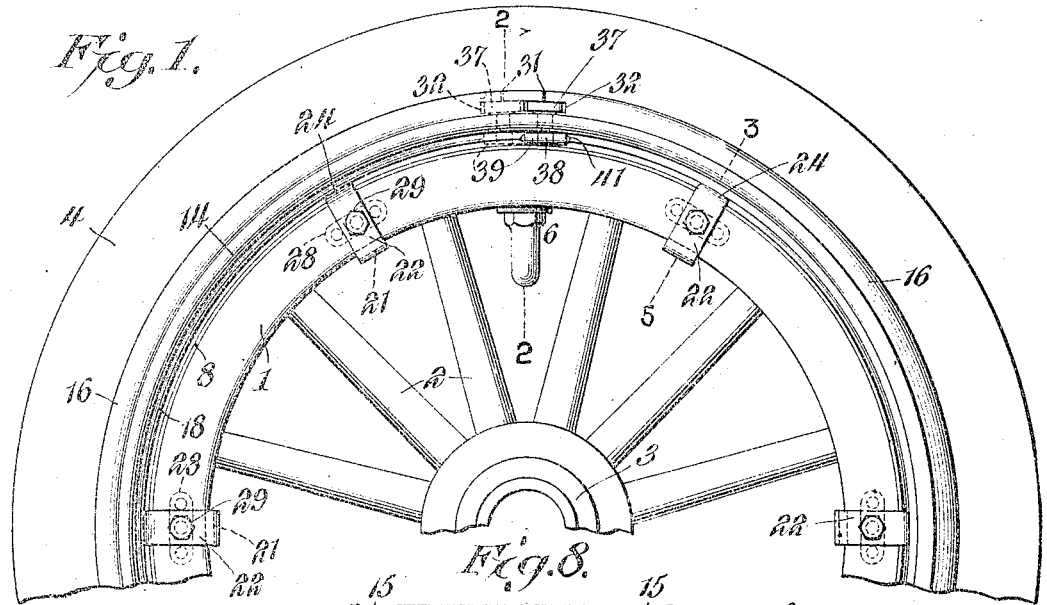
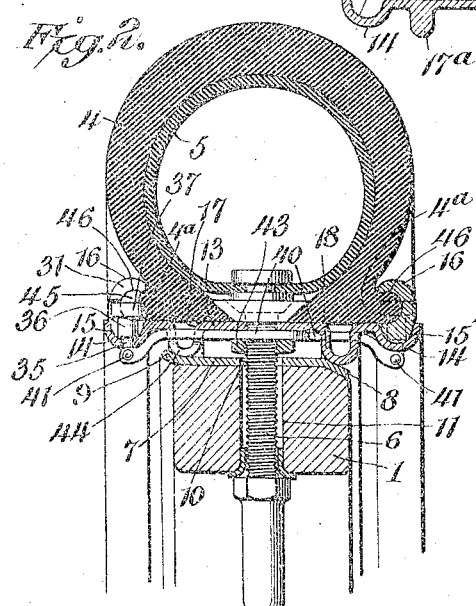
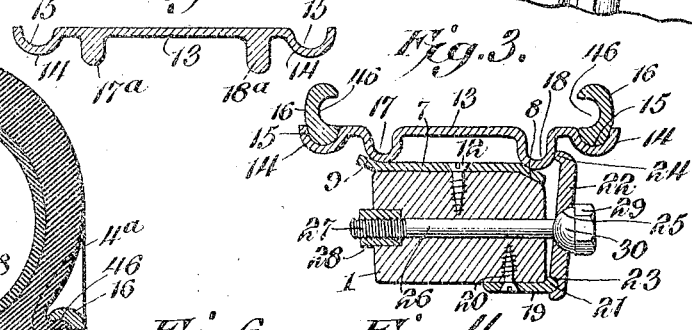
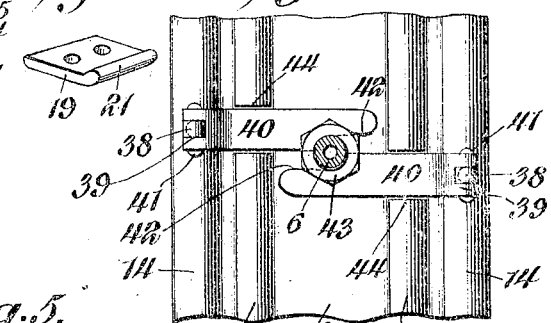
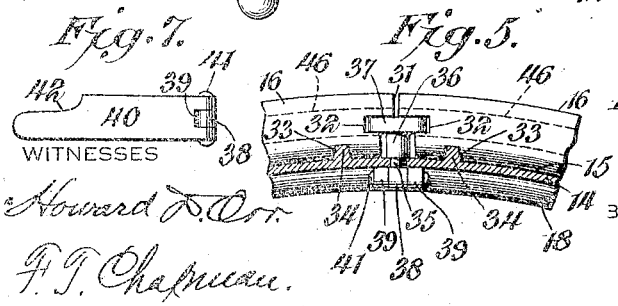
Frank P. Johnson,
INVENTOR,

UNITED STATES PATENT OFFICE.

FRANK P. JOHNSON, OF DANVILLE, PENNSYLVANIA.

WHEEL-RIM.

1,166,990.  Specification of Letters Patent.  Patented Jan. 4, 1916.

Application filed February 23, 1915.  Serial No. 10,069

*To all whom it may concern:*

Be it known that I, FRANK P. JOHNSON, a citizen of the United States, residing at Danville, in the county of Montour and State of Pennsylvania, have invented a new and useful Wheel-Rim, of which the following is a specification.

This invention has reference to wheel rims, and its object is to provide a wheel rim for the reception of a pneumatic tire, which wheel rim with the tire attached is readily demountable, and from which rim in the event of the tire becoming frozen thereto such tire may be easily removed.

In accordance with the present invention the wheel to which the wheel rim is to be applied has a peripheral portion, which in the case of a wooden-felly wheel is in the form of a peripheral bearing band, and this peripheral portion is shaped to receive the wheel rim from one side, so that the rim becomes wedged thereon when in proper position. Readily removable means are provided for holding the rim on the felly, such holding means being constructed for the taking up of wear and also so as to be free from strains liable to break or damage the holding means.

The rim has marginal side grooves for the reception of detachable tire holding rings, and carries locking means for the rings, which latter are so constructed as to coact with the locking means for holding the rings in place and quickly releasing them when desired. Furthermore, the rim is so formed that the surface engaged by the tire is cylindrical throughout, whereby on the removal of the marginal shoe retaining rings a thin blade or other suitable implement may be placed in traversing relation to the rim between it and the tire and then moved lengthwise of the rim for disengaging the tire from the rim in the event of the tire having become stuck or frozen to the rim.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is an elevation of a portion of a wheel showing the invention applied. Fig. 2 is a section on the line 2—2 of Fig. 1. Fig. 3 is a cross-section of the felly and rim in a plane corresponding to the line 3—3 of Fig. 1. Fig. 4 is a plan view of a portion of the rim at the point where traversed by the inner tube valve stem, the view being taken from beneath as the structures appear in Fig. 2. Fig. 5 is a side elevation of a portion of one of the tire holding rings and locking devices therefor with the corresponding portion of the rim in section. Fig. 6 is a detail perspective view of a portion of one of the rim locking members. Fig. 7 is a detail view of one of the latch arms for the ring lock. Fig. 8 is a cross-section of a modified form of the rim.

Referring to the drawings, there is shown a wheel provided with a felly 1, spokes 2, and hub 3 all as is usual in automobile wheels, and, furthermore, there is shown a pneumatic tire outer casing 4 having an inner tube 5 provided with the usual valve stem 6.

Applied to the outer periphery of the felly 1 in the particular structure shown in the drawings where the felly 1 is assumed to be a wooden felly, is a band 7 of metal, which in the main is flat, but has one edge 8 beveled toward the axis of the wheel, and the other edge 9 beveled away from the axis of the wheel. At the point traversed by the valve stem 6, the band 7 is provided with a suitable passage 10 and the felly 1 has a similar passage 11 which in practice is of ample size to permit the valve stem 6 to pass through it without binding, as is customary.

The band 7 is secured to the felly at suitable intervals by screws 12, one of which is shown in Fig. 3. There is also provided a peripherally continuous rim 13 wider than the felly and terminating at the margins in circumferential beads 14 providing grooves 15 opening at the outer peripheral surface of the rim. The grooves 15 receive tire holding rings 16 there being two such rings on opposite sides of the rim, and these rings may be substantially identical.

Between the beads 14 the rim is provided with other beads 17, 18, respectively, projecting from that face of the rim toward the felly. In the event of the rim being made of sheet metal rolled or pressed into shape, the beads 17 are hollow beads, but it is also feasible to make these beads solid, as in Fig. 8, where the beads are indicated at 17ª and 18ª, the rim being otherwise the same as in the other views, with parts in common with the other views designated by the same reference numerals.

The outer surface of the rim 13 is substantially flat or cylindrical from one side edge to the other, and in the absence of the rings 16 has no parts projecting from the outer peripheral surface.

When the tire casing 4 is seated on the rim 13 the rings 16 by engaging the beads 4ª of the casing hold the tire in place, and when both rings 16 are removed the tire may be slipped off sidewise from either side of the rim, since there is nothing on the rim to prevent such movement. However, it sometimes occurs that the tire becomes quite firmly stuck to the rim, or, as it is commonly known, the tire becomes frozen to the rim, and in such event where the tire abuts along one edge against a fixed flange, or where the rim is not cylindrical or laterally flat throughout its tire supporting surface, the removal of the tire from the rim is often a matter of great difficulty.

With the present invention, however, it is only necessary to remove both rings 16, which is easily accomplished by first starting each ring with a suitable tool, whereupon the ring may be easily sprung out from the rim progressively about the latter, the bead of the tire being sufficiently elastic for the purpose. Then by inserting a thin blade or other implement between the tire and rim crosswise of the latter, so that it may be grasped at both ends beyond the corresponding sides of the rim, it is a comparatively easy matter to pull the implement lengthwise of the rim and tire and so separate the tire from the rim throughout the circumference of the latter, whereupon the tire is as readily removed from the rim as though the freezing had not occurred.

The beads 17 and 18, or 17ª and 18ª, as the case may be, project toward the axis of the rim to different extents. The bead 17 may be readily moved upon the band 7 from that side provided with the bevel edge 8 until the bevel edge 9 is reached. The bead 18 extends toward the axis of the rim to a greater distance than the bead 17, so that it will not move upon the outer surface of the band 7, but will move into engagement with the bevel edge 8. The bead 14 which first moves over the band 7 does not extend toward the axis of generation sufficiently to engage the bevel edge 9, so that it does not interfere with the application of the rim to the felly.

The rim is therefore readily applied to the wheel from one side thereof, this being the outside of the wheel when in place upon an automobile, and this applying movement is continued until the bead 17 engages the bevel 9 and the bead 18 engages the bevel 8, the parts being properly proportioned for such a result. The bevels 8 and 9 act upon the respective beads 18 and 17 after the manner of wedges, so that any force tending to move the rim sidewise of the wheel after the beads engage the respective bevels only serves to tighten the engagement of the rim on the wheel, and such force may be sufficient to so secure the rim to the wheel that it will effectively withstand any creeping tendency. Still, because of the bevel surfaces 8 and 9, the rim is very readily removed from the wheel after the holding force has been relieved.

In order to secure the rim to the wheel plates 19 are secured at suitable intervals about the felly to the inner peripheral face thereof, and the fastening means for the plates may consist of screws 20. Each plate 19 which is of relatively short circumferential extent terminates just beyond that edge of the felly corresponding to the bevel edge 8 of the band 7 in a bead or enlargement 21 of rounded cross-sectional contour. There is also provided another plate 22 as wide as the plate 19, and near one end this plate is formed with a lateral groove 23 shaped to receive the bead 21, which latter then acts after the manner of a hinge pintle. The plate 22 is extended radially of the felly 1 toward the rim 13 and terminates in an angularly disposed nose 24 along and projecting from that edge of the plate remote from the groove 23. The length of each plate 22 is such that when the bead 21 is seated in the groove 23 the nose 24 engages that side of the bead 18 which is toward the outside of the wheel and so may be termed the outer face of the bead.

At a point about midway of the length of the plate 22 it is provided with a passage 25 for a bolt 26, which latter extends laterally through the felly and terminates in a threaded end 27 screwed through a nut 28 on that side of the felly remote from the plate 22. That end of the bolt 26 remote from the threaded end 27 is formed with a head 29 which may be hexagonally or otherwise shaped for the application of a tool, and the head where joining the shank of the bolt 26 is made of semi-spherical form, as shown at 30. The passage 25 through the plate 22 is countersunk in conformity with the semi-spherical portion 30 of the bolt, so that the latter may at all times engage the plate 22 without strain irrespective of hinge movements of the plate upon the bead 21. The bolt 26 serves as a means for forcing the rim 13 tightly upon the bevel portions 8 and 9 of the band 7 without bringing upon either the bolt 26 or the plate 22 any undue strain due to the changing relations of the bolt and plate, and from time to time any wear or loosening which may occur is readily taken up.

As many tire holding and locking plates 22 are provided as may be found advisable. Usually six are sufficient, but this does not preclude the use of a different number of these fastening devices.

Each ring 16 is a split ring; that is, its continuity is broken at one point, as indicated at 31 in Fig. 5. The adjacent or abutting ends of each ring 16 have recesses 32 formed therein and adjacent to these abutting ends those margins of the rings 16 which seat in the grooves 15 have notches 33 therein, while the rim 13 within the groove 15 is formed with spaced lugs 34 adapted to enter the notches 33. Between the lugs 33 the walls of the head 14 are traversed by a pin 35 terminating within the groove in a neck 36 which in turn carries a laterally extended head 37 of a length to enter both notches 32 simultaneously. The adjacent ends of each ring 16 are cut away on opposite sides of that portion occupied by the head 37 which projects between these adjacent ends, so as to receive the neck 36 and the spacing of these cut away portions is sufficient to permit the passage of the head 37 when so turned that it no longer enters the notches 32. That end of the stem 35 remote from the head 37 is formed into an eye 38 straddled by the bifurcated end 39 of an arm 40 which is held to the eye 38 by a pivot pin 41. The arm 40 may be manipulated to turn the pin 35 on its longitudinal axis to correspondingly turn the head 37, so that its ends either engage in the notches 32 or are at right angles thereto, and in position to release the adjacent ends of the ring 16.

When the two heads 37 are in position to engage in the notches 32 of the rings 16, thus locking them in the respective grooves 15, the arms 40 may be turned upon the pivots 41 into engagement with the under or inner face of the rim 13. The arms 40 and heads 37 are so located that the arms 40 when folded against the inner face of the rim are located on opposite sides of the valve stem 6, each arm being recessed or cut away, as indicated at 42, to permit such movement. When the arms 40 are lodged against the inner face of the rim 13 they are secured in such position by a nut 43 which may be the usual clamp nut applied to the stem 6. In order to prevent the ribs 17 and 18 from interfering with the folding of the arms 40 against the inner face of the rim 13, these ribs are cut away as shown at 44.

In applying the tire 4 to the rim 13, one of the rings 16 is seated in the corresponding groove 15 with the lugs 34 engaging in the notches 33 and the ends of the ring closely adjacent, the head 37 having been first moved so that it extends transversely of the length of the ring 16 and in this condition it is assumed that the nut 43 has been unscrewed for an appropriate distance along the stem 6.

In order to lock the applied ring 16 in its groove 15, the head 37 is turned so that its ends engage in the notches 32, in which case the arm 40 may be either allowed to hang pendently or may be moved against the inner face of the rim 13 and against the stem 6. Now, the tire is applied in the usual way to the rim, the shoe of the tire being appropriately notched, as shown at 45 to receive the head 37 which then encroaches upon the groove on the inner face of the ring 16 provided for the reception of the outer bead of the tire shoe, such groove being shown at 46. When the tire has been properly seated on the rim the other ring 16 is applied and locked in place in the same manner as the first ring with its arm 40 extending to the other side of the valve stem 6 from that occupied by the first-named arm 40. Now on tightening up the nut 43 the two arms 40 are effectively locked in position against any liability of accidental displacement. With the tire so arranged and if desired with the inner tube 5 blown up, which latter act is performed after the tire is suitably seated and locked on the rim 13, the entire rim with the tire is moved upon the band 7 from that side of the band provided with the bevel 8, and this movement is continued until the rib 17 engages the bevel 19 and the rod 18 engages the bevel 8. Now, by applying the plates 22 and tightening up the bolts 26, the tire rim is firmly secured upon the felly of the wheel. When it is desired to remove the rim and tire from the wheel it is only necessary to loosen the bolts 26, whereupon the plates 22 may be turned upon the bolts as pivots, thus carrying their ends 24 out of the way of the rim 13.

Should it become necessary to remove the tire as in the case of a puncture where a new inner tube is needed, the rim with the tire is removed from the wheel by loosening the bolts 26 and displacing the plates 22 and then both rings 16 may be removed, especially if the tire be stuck fast to the rim as frequently occurs. Then the tire is very readily loosened from the rim in the manner already described. In the case of puncture or other disability of the tire the rim is quickly removed to be replaced by another rim and inflated tire thereon after the manner of using demountable rims. Should any looseness between the rim and felly occur this is easily taken up by tightening the bolts 26 and such wear as is incident to the application and removal of the rim is readily compensated for by the bolts 26 and plates 22 which at the ends 24 may have an appropriate amount of movement due to the pivot connection formed by the rib 21 and groove 23. The globular portion 30 of the bolt 26 and the correspondingly countersunk passage for the bolt form a connection of the ball and socket type eliminating all uneven strains from the plate 22 and from the bolt, and thus relieving both from forces tending to injure or break them.

The rings 16 are readily adapted for use with either the clencher or the straight side tire casing and either or both of these rings may be removed in accordance with circumstances.

No claim is made in this application for the locking device for holding the demountable rim on the wheel rim, as the claims for this feature will be presented in a separate application.

The broad idea of a locking member mounted for rotary movement on the rim and having an engaging portion or head located at the meeting ends of the split tire-retaining ring and arranged to be carried into and out of engagement with the said meeting ends by the rotary movement thereof, and a manipulating arm or lever for turning the locking member into and out of such engagement, is not claimed in this application, but is the subject-matter of an earlier application filed by me May 27, 1912, Serial No. 699,965. The specific feature differentiating the locking device of this application from the aforesaid application resides in the fact that the locking devices are duplicated, and the manipulating hasps or arms for said locking devices are mounted so as to engage opposite sides of the valve nipple.

What is claimed is:—

1. A wheel rim for pneumatic tires having an outer transversely flat cylindrical tire receiving surface with marginal circumferential grooves therein and circumferential beads on the face of the rim opposite to that receiving the tire, said beads being located between the circumferential mid line of the rim and the marginal grooves and of greater radial extent than the marginal grooves.

2. A wheel rim for pneumatic tires having marginal circumferential grooves in its tire receiving face and intermediate beads on the face of the rim opposite to that receiving the tire, and the tire receiving face being substantially cylindrical throughout its width.

3. A demountable rim structure for tires comprising a rim having means for supporting it upon and spacing it from the peripheral portion of a wheel, tire retaining split ring means adapted to the rim, and locking means for the split ring means provided with manipulating means movable into the space between the rim and peripheral portion of the wheel.

4. A demountable rim structure for pneumatic tires comprising a rim having wheel engaging parts spacing the rim from the peripheral portion of the wheel, split-ring tire-retaining means on the rim, and locking means for the split ring means provided with manipulating and retaining means movable into the space between the rim and peripheral portion of the wheel and located with reference to the valve nipple of the inner tube of the pneumatic tire to be engaged by the clamp nut of said nipple.

5. A demountable rim structure for pneumatic tires comprising a rim having circumferential beads on its inner face for engaging the peripheral portion of the wheel, said beads spacing the rim from the peripheral portion of the wheel, removable split rings carried by the rim at opposite sides thereof, and locking means for and individual to the rings, each locking means having a manipulating member movable into the space between the rim and peripheral portion of the wheel, the locking means being displaced circumferentially to be moved into engaging relation to opposite sides of the valve nipple of the inner tube of the tire in the path of the clamp nut of said nipple.

6. A demountable rim structure for pneumatic tires comprising a rim having circumferential beads on its inner face for engaging the peripheral portion of the wheel, said beads spacing the rim from the peripheral portion of the wheel, removable split rings carried by the rim at opposite sides thereof, and locking means for and individual to the rings, each locking means having a manipulating member movable into the space between the rim and peripheral portion of the wheel, the locking means being displaced circumferentially to be moved into engaging relation to opposite sides of the valve nipple of the inner tube of the tire in the path of the clamp nut of said nipple, and the spacing beads on the inner face of the rim being cut away to receive the manipulating means.

7. A rim for pneumatic tires, provided with removable split rings on opposite sides, and locking means for the rings individual thereto and each comprising a rockable lock member carried by the rim in position to engage the ring, and a manipulating arm pivoted to the lock member and movable about its pivotal axis toward the rim, the manipulating arms for the lock members of the two rings being provided with holding means common to both.

8. A rim structure for pneumatic tires comprising a rim, removable split rings on opposite sides thereof, a rockable locking device for the contiguous ends of each split ring, and an arm for each locking device pivoted thereto and movable about its pivotal axis toward the rim in adjacent relation to the arm of the locking device of the other ring, and a holding means common to both arms for locking them in the last named position.

In testimony, that I claim the foregoing as my own, I have hereto affixed my signature in the presence of two witnesses.

FRANK P. JOHNSON.

Witnesses:
DORA SCHATZ,
PAULINE F. FARNSWORTH.